US011922359B2

(12) United States Patent
Kucheria et al.

(10) Patent No.: US 11,922,359 B2
(45) Date of Patent: Mar. 5, 2024

(54) SYSTEM AND METHOD FOR SECURELY TRAINING AND USING A MODEL

(71) Applicant: ABB Schweiz AG, Baden (CH)

(72) Inventors: Alok Kucheria, Raleigh, NC (US); Karl Eric Harper, Cary, NC (US)

(73) Assignee: ABB Schweiz AG, Baden (CH)

( * ) Notice: Subject to any disclaimer, the term of this patent is extended or adjusted under 35 U.S.C. 154(b) by 527 days.

(21) Appl. No.: 16/397,554

(22) Filed: Apr. 29, 2019

(65) Prior Publication Data
US 2020/0342370 A1 Oct. 29, 2020

(51) Int. Cl.
G06Q 10/06 (2023.01)
G06N 20/00 (2019.01)
G06Q 10/067 (2023.01)

(52) U.S. Cl.
CPC ........... *G06Q 10/067* (2013.01); *G06N 20/00* (2019.01)

(58) Field of Classification Search
CPC ..... G06N 20/20; G06F 17/16; G06F 11/3055; G06F 21/60; G06F 18/41
See application file for complete search history.

(56) References Cited

U.S. PATENT DOCUMENTS

| | | | | |
|---|---|---|---|---|
| 5,903,721 A | * | 5/1999 | Sixtus | H04L 9/40 726/2 |
| 2017/0372226 A1 | * | 12/2017 | Costa | G06F 21/6245 |
| 2018/0075137 A1 | * | 3/2018 | Lifar | G06F 16/337 |
| 2018/0189609 A1 | * | 7/2018 | Park | G06F 18/41 |
| 2018/0285204 A1 | * | 10/2018 | Dwarampudi | G06F 16/116 |
| 2019/0087689 A1 | * | 3/2019 | Chen | H04L 9/0825 |
| 2019/0114151 A1 | * | 4/2019 | Jacobs | G06F 8/33 |
| 2020/0184380 A1 | * | 6/2020 | Thomas | G06N 3/063 |
| 2021/0166157 A1 | * | 6/2021 | Bhowmick | G06N 20/20 |

OTHER PUBLICATIONS

"Decentralized machine learning—White Paper," downloaded from the Internet at https://www.decentralizedml.com/DML_whitepaper_31Dec_17.pdf on Apr. 29, 2019, 58 pp. (Dec. 31, 2019).
Geyer et al., "Differentially Private Federated Learning: A Client Level Perspective," 31st Conference on Neural Information Processing Systems (NIPS 2017), Long Beach, CA, U.S.A., 9 pp. (Dec. 20, 2017).
Hanzlik et al., "MLCapsule: Guarded Offline Deployment of Machine Learning as a Service," arXiv preprint arXiv:1808.00590, 14 pp. (2018).

(Continued)

*Primary Examiner* — Saba Dagnew
(74) *Attorney, Agent, or Firm* — Leydig, Voit & Mayer, Ltd.

(57) ABSTRACT

A system and method for securely training a model comprises including the algorithms of the model into a training module, and communicating the training module from a vendor computer system to a customer computer system. The training module is operated on the customer's computer system using the data from the customer, and a trained training module is achieved after operating the training module on the customer's computer system. The trained training module is used to initialize at least one additional module, which is communicated from the customer's computer system to the vendor's computer system, is used to score observations.

21 Claims, 7 Drawing Sheets

(56) References Cited

OTHER PUBLICATIONS

Leroux et al., "Privacy Aware Offloading of Deep Neural Networks," arXiv preprint arXiv:1805.12024, 3 pp. (2018).
Osia et al., "A Hybrid Deep Learning Architecture for Privacy-Preserving Mobile Analytics," *ACM Transactions on Knowledge Discovery from Data*, 1(1), 21 pp. (Jan. 2018).
Zhu et al., "2P-DNN: Privacy-Preserving Deep Neural Networks Based on Homomorphic Cryptosystem," arXiv preprint arXiv:1807.08459, 12 pp. (2018).
European Patent Office, Extended European Search Report in European Patent Application No. 20168773.8, 13 pp. (dated Sep. 11, 2020).

\* cited by examiner

SYSTEM AND METHOD FOR SECURELY TRAINING AND USING A MODEL

FIELD OF THE DISCLOSURE

The present disclosure relates to systems and methods for machine learning.

BACKGROUND OF THE INVENTION

Machine Learning and related technologies currently pervade many technological areas because of their usefulness in the design, manufacture, management and improvement of modern industrial assets. Machine learning algorithms can help provide improved product designs and more intelligent asset management. In typical applications, assets with adaptive or learning algorithms continuously learn or adapt their operation based on real and/or virtual data streams to improve operational stability and efficiency in dynamic environments. The systems that enable the operation and learning of adaptive algorithms are often tasked with processing large amounts of structured and unstructured sensor data from various platforms in test or production environments, and yield scoring assessments and predictions relative to those assets that are useful in improving operational efficiency, eliminating unplanned down-time and reducing maintenance costs.

By default, due to the nature of these systems, it is often challenging to gain access to an optimal model design, including learning infrastructure and algorithms, and sufficiently complete and diverse data streams to more fully train effective models. This is because the model design is typically proprietary for the asset vendor, and underlying data is almost always generated at the site of the asset and is considered confidential and proprietary for each user of the assets. At the same time, vendors of machine learning systems are not located in-house where the assets are operating, nor are they exclusively dealing with more than a few particular customers at any one time, which necessitates the transfer of the data from the customer to the vendor, or the transfer of the model design from the vendor to the customer, neither of which may be an appealing proposition for the vendor and/or customer. A compromise solution is to transfer the data, and to perform the training on a remote environment hosting the learning infrastructure and algorithms, for example, a cloud service, that is separate and apart from either the customer or vendor internal systems. Such a solution also has drawbacks in that vendors may not trust the cloud to keep their model design private, and the customers typically will not trust the cloud to keep their data private and secure. Both parties may also not trust the cloud network to operate reliably on a continual basis. Vendors also do not want their training infrastructure, algorithms, and intellectual property to reside and operate openly at the customer site in order to access the local data streams, and customers do not want their unprotected data residing and accessible in remote locations to train models, for the same reasons.

BRIEF SUMMARY OF THE INVENTION

In one aspect, the disclosure describes a method for a vendor to facilitate training a model using data from a customer. The model contains algorithms, and a training process involves the data from the customer being present in a training infrastructure. The method comprises including the algorithms of the model into a training module, and communicating the training module from a vendor computer system to a customer computer system. The training module is operated on the customer's computer system using the data from the customer, and a trained training module is achieved after operating the training module on the customer's computer system. The trained training module is used to initialize at least one additional module, which is communicated from the customer's computer system to the vendor's computer system, is used to score observations.

In another aspect, the disclosure describes a non-transitory computer readable storage medium comprising instructions that, when executed by a processing device in a vendor computer system, cause the processing device to structure, using the processing device, a model into a training module; communicate with a customer computer system, the customer computer system containing customer data stored in a computer readable form; transmit the training module to the customer computer system for training based on the customer data; and transform the training module into a trained training module in customer's computer system and initialize an operational module and an insight module.

In yet another aspect, the disclosure describes a system that includes a memory to store instructions; a processing device operatively coupled with the memory to execute the instructions stored in the memory, the processing device configured and operating to: structure a model into a training module; communicate with a customer computer system, the customer computer system containing customer data stored in a computer readable form; transmit the training module to the customer computer system for training based on the customer data; extract training results from a trained training module into an operational module and an insight module in the customer computer system; and receive the insight module from the customer computer system to complete the model.

BRIEF DESCRIPTION OF THE SEVERAL VIEWS OF THE DRAWING(S)

DETAILED DESCRIPTION OF THE INVENTION

Figure 1:
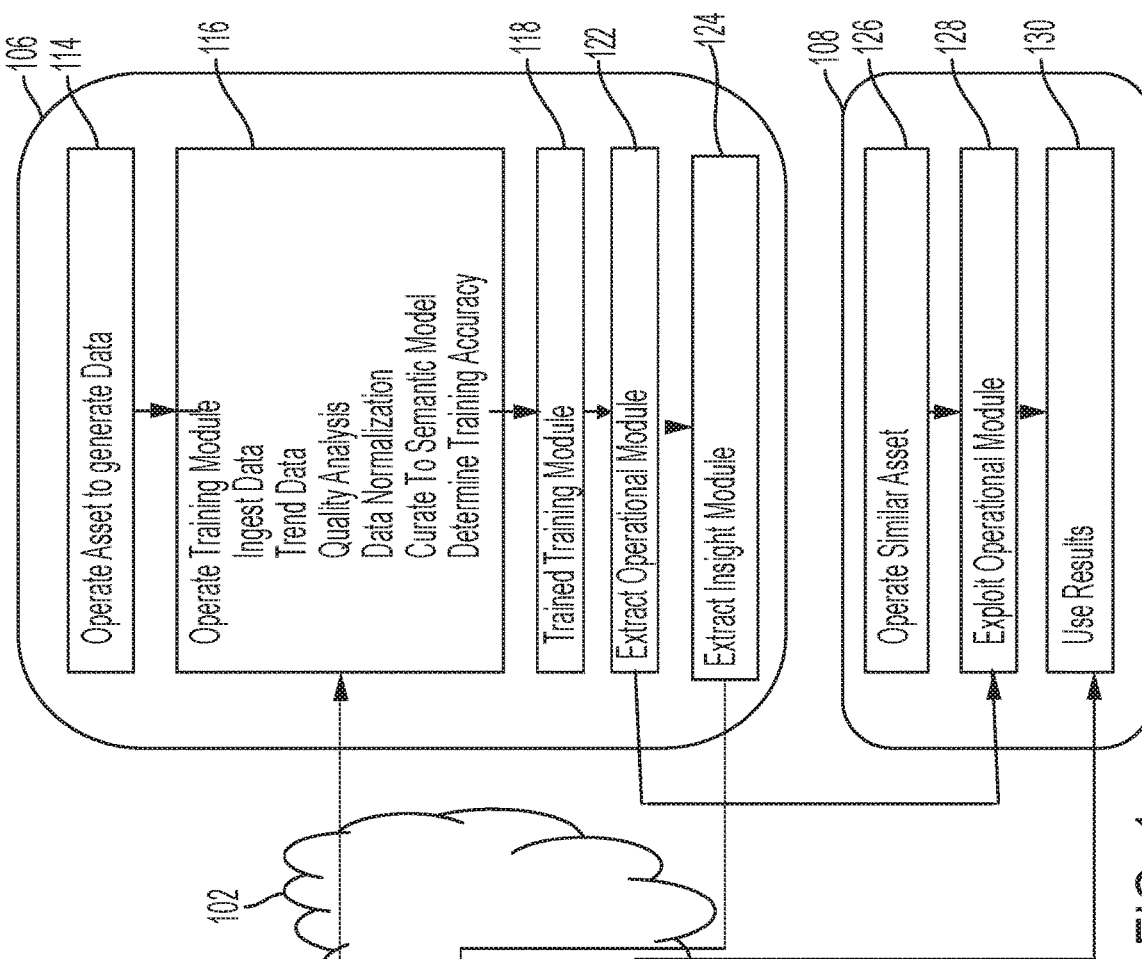
FIG. 1 is a block diagram showing a topology of a collaborative fleet intelligence system (CFIS) in accordance with the disclosure.
Figure 1:
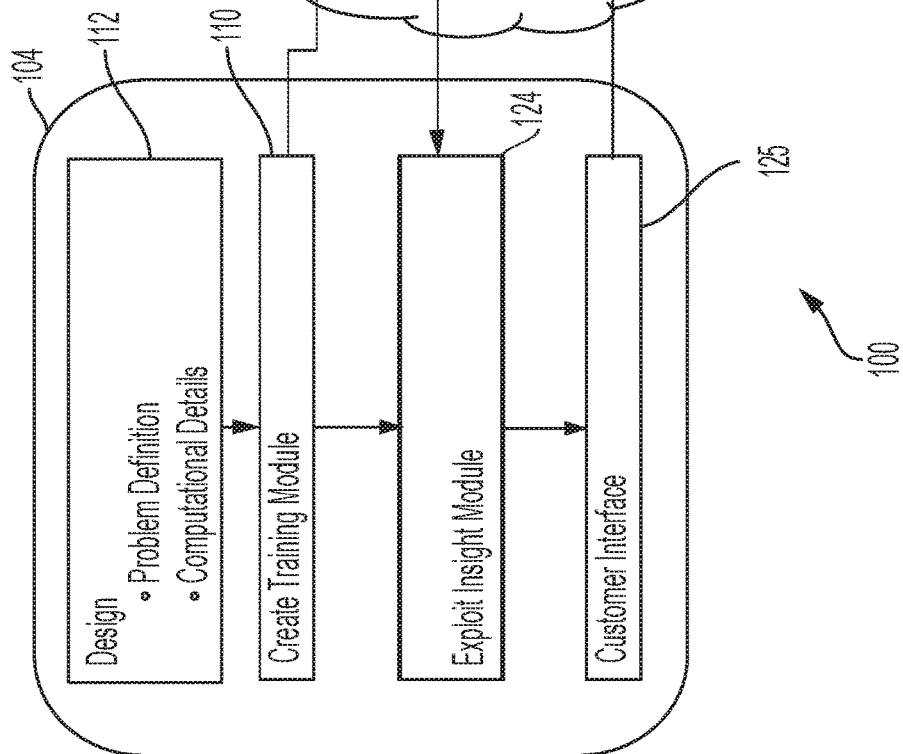

The present disclosure is applicable for creating complete machine learning applications or models using data generated by working assets at a customer's location but without transferring the data to a vendor's system, protecting the vendor's machine learning instrumentality when it resides on the customer's system, and creating and using different portions of modules of the machine learning instrumentality that are native in the respective systems of one or more customers, and the vendor. The modules, their contents and use are protected using security certificates or the like. For example, a module produced by the vendor to be shared with the customer is created using the customer's public key and can only be accessed with the customer private key. In addition, a module produced by the customer to be shared with the vendor is created with the vendor's public key and can only be accessed with the vendor private key. Either party can choose to produce unlocked modules if no proprietary concerns on the module and/or the underlying data exist.

The customer and vendor can choose to share each other's intellectual property once the value has been established and the parties agree. In this way, the complete solution can be assembled by the vendor without needing access to the customer's underlying data. In addition, the complete solution can be assembled by the customer without needing open access to the vendor's model design. Alternatively, the customer and vendor can work collaboratively to operate the advanced analytics application value without the need to share proprietary information. The system includes aggregation of sub-modules to gauge applicability to asset types and operating environments, and also permits extensive quality control on the data used to train the models.

In one general aspect, data generated by a customer will remain at all times in the customer's possession and control. Such data may include collections of operating data acquired by sensors associated with assets operating at the customer's facilities, which may relate to particular components or systems and also to entire processes, for example, for manufacturing or distributing products or other commodities such as electrical or mechanical power and the like. The volume, velocity and variety of data is assessed and evaluated by the system, which can also classify the data with respect to any desired dimension or attribute, for example, the geographical area of the asset's operation. Such processing helps produce more reliable data sets for use in training a machine learning instrumentality, and can also be used to create specialized modules and training regimens for models that are better suited for use in an asset of a different customer that is operating under similar operating and/or environmental conditions.

One focus area of the CFIS is the collaboration aspect, in that any one customer's data is processed and distilled into a training regimen, which also includes contextual information for the asset and its use. The data itself is not used by the vendor, but rather the data is summarized and analyzed at the customer's facility. The results of this summary and analysis provides experience and context for the models, a portion or aspect of which is compiled on the customer's systems. Those portions of models and characterization information on the underlying data are used to create modules, are then transferred out of the customer's systems securely packaged. The training module is used to produce the operational module and to produce the insight module, and these modules are particularly tailored for specific assets operating in certain conditions and locales.

For exemplary illustration, in one embodiment, the training module includes a model design, which can be implemented in a variety of modeling techniques such as neural net layers, regression parameters, and the like. Data observations are provided to the training module to yield a trained model. The training module may also operate to aggregate the data and also the results of the training. Advantageously, the training module exists in an encrypted form such that reverse engineering of the proprietary model architecture it contains is made more difficult. The information generated by the training module is related to the customer data but otherwise contains no actual customer data. The trained training module then provides information to an operational module, which only the customer can use and prepares the information required to apply a solution. In addition, the trained training module then provides information to an insight module, which only the vendor can use. In a sense, the operational module provides an input to the insight module, which processes the intermediate data it ingests to provide an output.

Multiple training modules can be used to create multiple operational modules and, in some instances, common trends and conclusions can be used to create insight modules, all without having to directly access the underlying customer data from the vendor's standpoint. These and other aspects of the present disclosure will now be described in further detail. In certain embodiments, of course, the training, operational and insight modules may all be included in a single "combined module" that is provided as a complete solution to a customer that operates assets at a customer facility.

A block diagram showing a topology of a CFIS 100 in accordance with the disclosure is shown in FIG. 1. As can be seen from this illustration, the CFIS 100 implicates more than one systems that are communicatively and selectively connected by encrypted communications via a communication environment 102, which may be any electronic mode of electronic communication modality that includes provisioning for secure communications between physically remote servers. In the exemplary topology shown, three different environments are implicated and described, which include a vendor 104, a training facility 106, and a user facility 108. The term environment as used herein is meant to have an expansive scope that can include any physical or virtual environments. For example, the vendor 104 can include an environment that exists in one or multiple locations, each of which including computing infrastructure such as servers, processors, databases, memory, communication devices, and the like, which are operated by specialized personnel. The training facility 106 may include facilities in which assets such as industrial equipment is operated having sensors, monitoring and control systems, and the like, associated therewith that provide data streams to computer systems operating or being associated with the training facility 106. In one embodiment, the vendor 104 may be an original equipment manufacturer of the various assets and/or sensors that are operating at the training facility 106, which a customer that operates the training facility 106 has purchased from the vendor 104 to carry out an industrial process. The user facility 108 may be similar to the training facility 106, i.e., be owned and operated by a different customer of the vendor that has purchased and uses similar equipment as the customer that owns the training facility 106.

One embodiment for a process of creating the CFIS 100 includes designing a suitable training module at 110 by the vendor 104. The training module itself may be implemented as a computer executable algorithm that includes machine learning functionality and is stored in computer readable media in the form of computer executable instructions. Creation of the training module at 110 may involve or require various assessments by the vendor, including problem definition and computational details determination at 112. For example, engineers of the vendor may analyze sample data using manual or, more typically, computational methods to identify patterns in the data that the asset is expected to generate using test data for that particular asset. A model feasibility study may also be conducted to determine a desired model type and configuration or model design that will be incorporated into the training module. Technological considerations may be used to adjust the contemplated model as necessary before the training module is actually created at 110.

It should be appreciated that the training module, and also the other modules discussed herein, in certain embodiments, may be embodied as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Once the training module has been created at 110, it is signed with the customer's public key, encrypted and transmitted to the training facility 106 via the communication environment 102 or an equivalent or a direct connection. Assets of the type used to assess feasibility of the models contemplated might already be operated and in service at 114 within the training facility 106 environment. Data or data streams generated or existing at the training facility 106 from the operating assets at 114 is provided to the received training module at 116 to train the training module. Training of the training module using the customer's private key at 116 may include many different operations and processes such as using the training module to ingest the data, analyze the data for trends and quality, for example, by examining a statistical spread or distribution of the data values, normalize the data, curate to existing semantic models included within the training module, perform testing to determine training accuracy, and other data operations.

After sufficient training has occurred, a trained training module is formalized at 118. The trained training module 118 has used raw data generated by operating the asset at 114, and it contains those raw data records itself and concludes its training by computing information about the data that is required for proper operation of the models. The trained training module 118 serves as a basis to extract an operational module at 122 and an insight module at 124. The extracted operational module 122 is restricted for only customer use, and the insight module 124 is restricted for only vendor use. These restrictions can be removed at a later stage with agreement between the vendor and customer. The extraction of the operational and insight modules 122 and 124 occurs at the training site 106 under the direction and control of the customer 106. Alternatively, customers with no concerns about exposing their data could send the trained training module 118 to the vendor 104 where the operational and insight modules 122 and 124 are extracted under direction and control of the vendor 104.

In one embodiment, extraction of the operational module at 122 is initialized with only a portion, for example, one half, of a divided configuration of training information and starts scoring observations. The operational module is protected using the customer's public key and can only be operated with knowledge of the customer's private key. In this way the value that can be generated from the entire solution is controlled in part by the customer. At an intermediate stage, the operational module results are extracted and are used as input to the insight module at 124. The insight module is protected using the vendor's public key and can only be operated with knowledge of the vendor's private key. In this way the value that can be generated from the entire solution is controlled in part by the vendor. The division and staging of the information in this fashion ensures that modules are working on the customer data and that value is being transferred without sharing of actual data. Accordingly, the insight module is initialized at 124 with the second half of the divided configuration and completes the scoring. The asset vendor 104 obtains the final results which can be fed back to a customer interface 125. This ensures that the complete model has never been exposed at the customer end at 106 or 108, yet the results are based on completely trained modules.

The operational module extracted at 122 and the insight module extracted at 124 are modules that can be used or are applicable to the assets operating at the training facility 106 or at any other different customer 108 that operates similar assets at 126. For example, another customer 108 can use the operational module at 128 and the insight module at 130 to more efficiently operate its assets at 126. These modules can be provided, for example, from the vendor's customer interface 125. Because of the similarity of assets operating at the facilities 106 and 108, the quality checks performed on the data during training, and other factors, the operational and insight modules created based on the assets in the training facility 106 are applicable to the assets operating at the customer 108. The operational and insight modules 122 and 124 can, of course, also be used in the training facility 106.

As can be appreciated, many different dimensions of the parameters with the greatest effect on the operational and insight modules can be accounted for by engaging one or more training facilities 106, training one or more training modules, and then using those to generate one or more operational and insight modules that can be tailored to a particular customer 108. The additional customer 108 itself can also volunteer to act as a training facility 106. Importantly, the training facility's data never leaves its native environment 106, and the modules are extracted at the customer 106 by the customer, such that with the training module protected by the customer and only deploying the operational and insight modules, no single deployment environment contains the data and the resulting models, which obviates any concerns over security and integrity of the data and models, as was the case in the past with previously proposed solutions. The communication environment 102 merely transmits encrypted information. In one embodiment, the training module itself remains in an encrypted form within the training facility environment 106 for its entire lifecycle.

Figure 2:
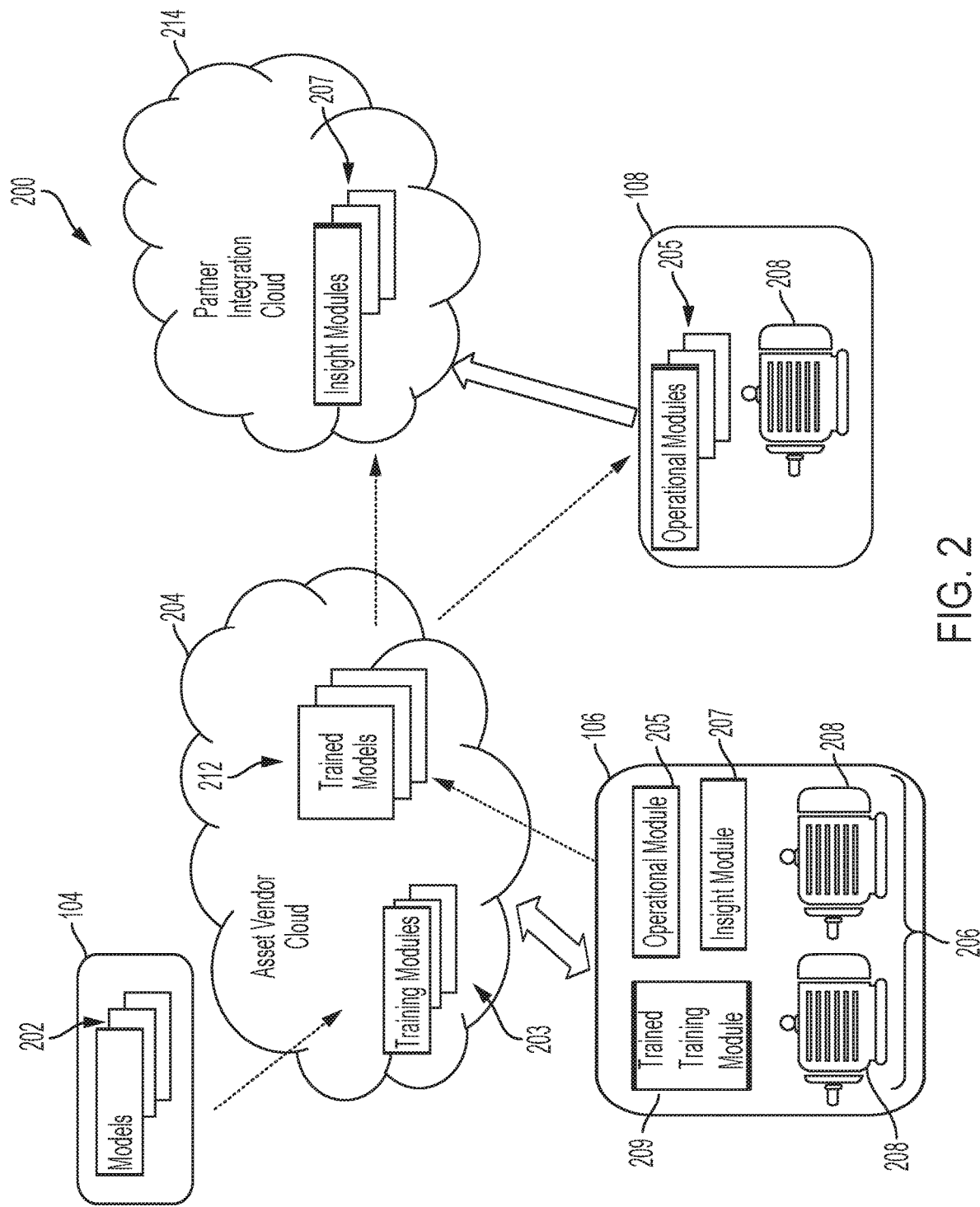
FIG. 2 shows an overall system architecture for an embodiment of the CFIS in accordance with the disclosure.

One embodiment for an overall system architecture for an embodiment of a CFIS 200 in accordance with the disclosure is shown in FIG. 2 to illustrate the collaborative aspects of the CFIS. For simplicity, elements and features shown and discussed in FIG. 2 that are the same or similar to corresponding elements and systems discussed relative to FIG. 1 above are denoted by the same reference numerals previously used for simplicity. In reference to FIG. 2, the CFIS 200 includes the vendor 104, who possesses and develops a fleet of models 202, which are deployed within an asset vendor cloud 204 as empty training modules 203 configured for specific customers 106. The asset vendor cloud 204 is a secure cloud or other secure electronic communication modality that is owned, operated and controlled by the vendor 104. The fleet of training modules 203 is deployed in the asset vendor cloud 204, from where it can be retrieved by a customer at a training facility 106.

As previously described the training facility may include a plurality of assets 206, and also training modules 203 developed for training at other customer facilities, for example, the training facility 106. The various modules may correspond or be tailored for particular machines 208 or machine systems. After training is complete, and the operational and insight modules are extracted from the trained training modules 209 and the application deployed as described previously with the operational module executing at the customer site 106 and the insight module executing in the vendor cloud 204. If both modules are transferred to the vendor cloud 204 this comprises the complete trained models 212. For collaboration, the operational module 205 parts of trained models 212 with revised restrictions are ready to deploy to other customers such as customer 108, and the insight module 207 parts of trained models 212 are ready to deploy to one or more partner integration clouds 214, restricted for only their use. It should be appreciated that processing of the trained training modules into the operational and insight modules can be done on the vendor's systems either online or within the vendor asset cloud 204 if the customer chooses to derestrict and share the trained training module 212 with the vendor 204.

By design, it is contemplated that multiple training modules may be used to create multiple operational module configurations, which generate intermediate results that are ingested into multiple insight module configurations. These multiple, parallel model creation processes will result in a fleet of functional trained models 212 that are maintained by the vendor 104, for example, within the vendor asset cloud 204. The various modules may have local or global applicability, and also be tailored to operate with various asset models and configurations. In one embodiment, a customer 108, and especially a larger customer with multiple physical facilities, may serve as a strategic partner to the vendor and maintain its own partner integration cloud 214, from which modules specific to assets of the customer 108 can be used as needed. The fleet of insight modules 207 parts of trained models 212 can be made available and maintained by the vendor 104 on the partner integration cloud 214 on an ongoing basis and as a service, for example, a subscription service.

Figure 3:
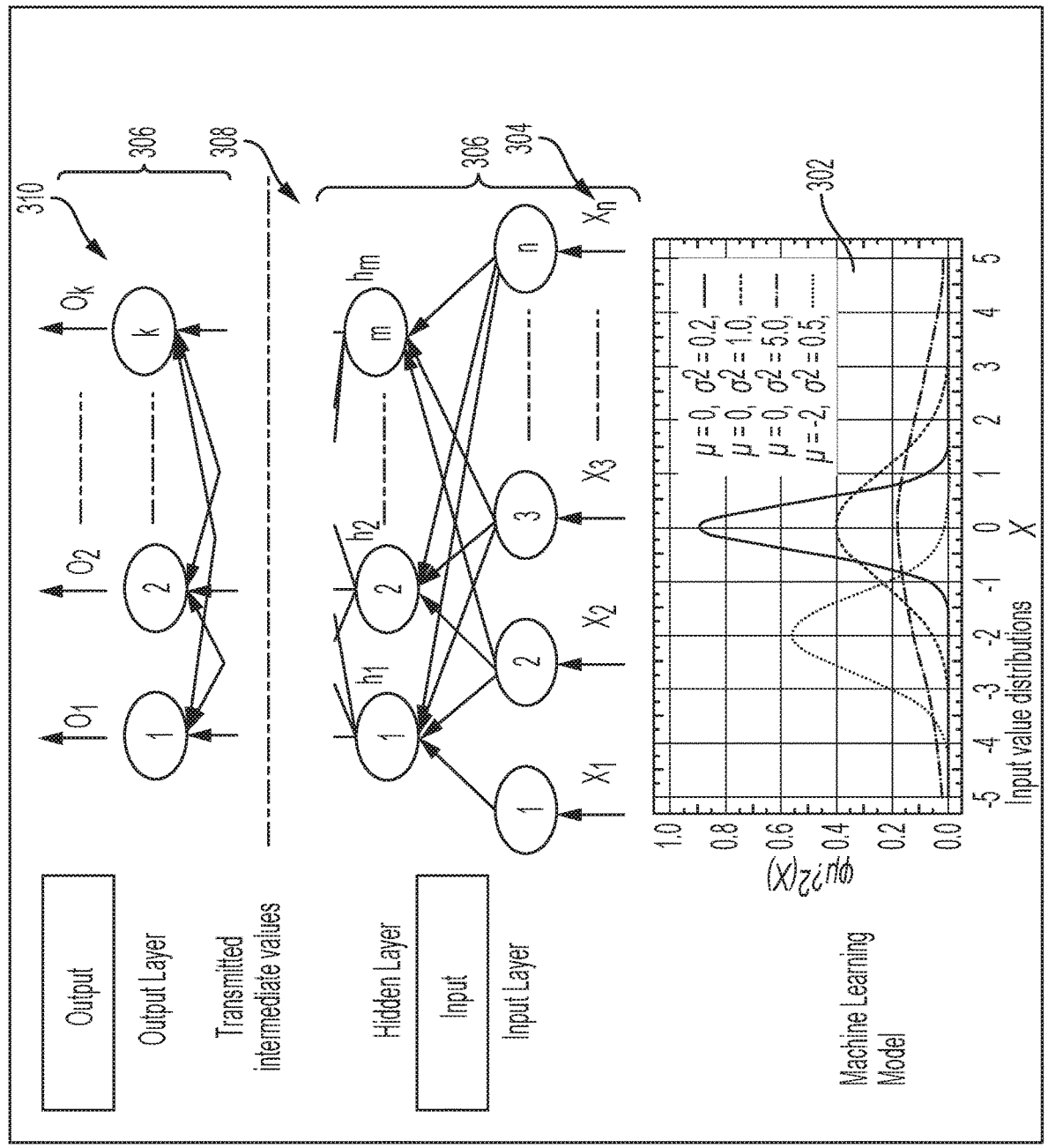
FIG. 3 is a process schematic for one embodiment of the CFIS in accordance with the disclosure.

An exemplary process schematic for initializing operational and insight modules from portions of the model configuration contained in trained training modules is shown in FIG. 3. In the illustrated embodiment, a neural network model configuration is used to illustrate the initialization process, but it should be appreciated that other machine learning techniques can also be encompassed under the framework as model synergies are developed. In reference to the process illustrated, the training module may first analyze input data streams to determine quality metrics such as consistency. In the embodiment shown, for example, data point distributions 302 for various data streams that evaluate the probability distribution, mean and standard deviation of the data points may be used to determine data spread and consistency. These characterizations are captured as part of the extracted operational module. The characterization of data in this fashion ensures not only the data quality, but also serves as a classification of the data character used to train the module and provide a basis for selecting a trained module later to apply to another customer's system, whose data character more closely matches the character of the data produced by an asset that the customer might use.

Data that is determined to have good repeatability, i.e., there is a high confidence that new values will fit within the initial distributions used to train the model, is provided as an input layer 304 of a model 306. For the neural network example, the input layer combined with the hidden layer will become substantially part of the operational module after training is complete, and the output layer will become substantially part of the insight module after training is complete. The model 306 input and output sections are combined in the training module for training purposes, which is embodied as a neural network model in this example and can be split into various pieces for distributed scoring including structure-weight split, layer split, loss-activation split, hash encoder split, and the like. Training feedback also crosses the divide 308. The split or divided scoring between what becomes the operational and insight modules effectively insulates the customer input layer 304 from a vendor output layer 310. Transmission of intermediate values across the divide 308 insulates the input and output values from one another and ensures that no data leakage from the input layer is accessible on the output layer 310 directly, and vice versa. Thus, if the divide 308 includes transmitting encrypted data over a channel such as the communication environment 102 (FIG. 1) between the training facility (e.g. facility 106) to the vendor (e.g. the vendor 104), the data and resulting split or divided models remain the property of the customer or vendor only, without the possibility of proprietary information passing from one to the other accidentally.

By separating the input layer 304 from the output layer 310, additional advantages can be realized. For example, each intermediate transfer 308 can include timestamps during transfer to prevent replay attacks and ensure security and traceability.

Figure 4:
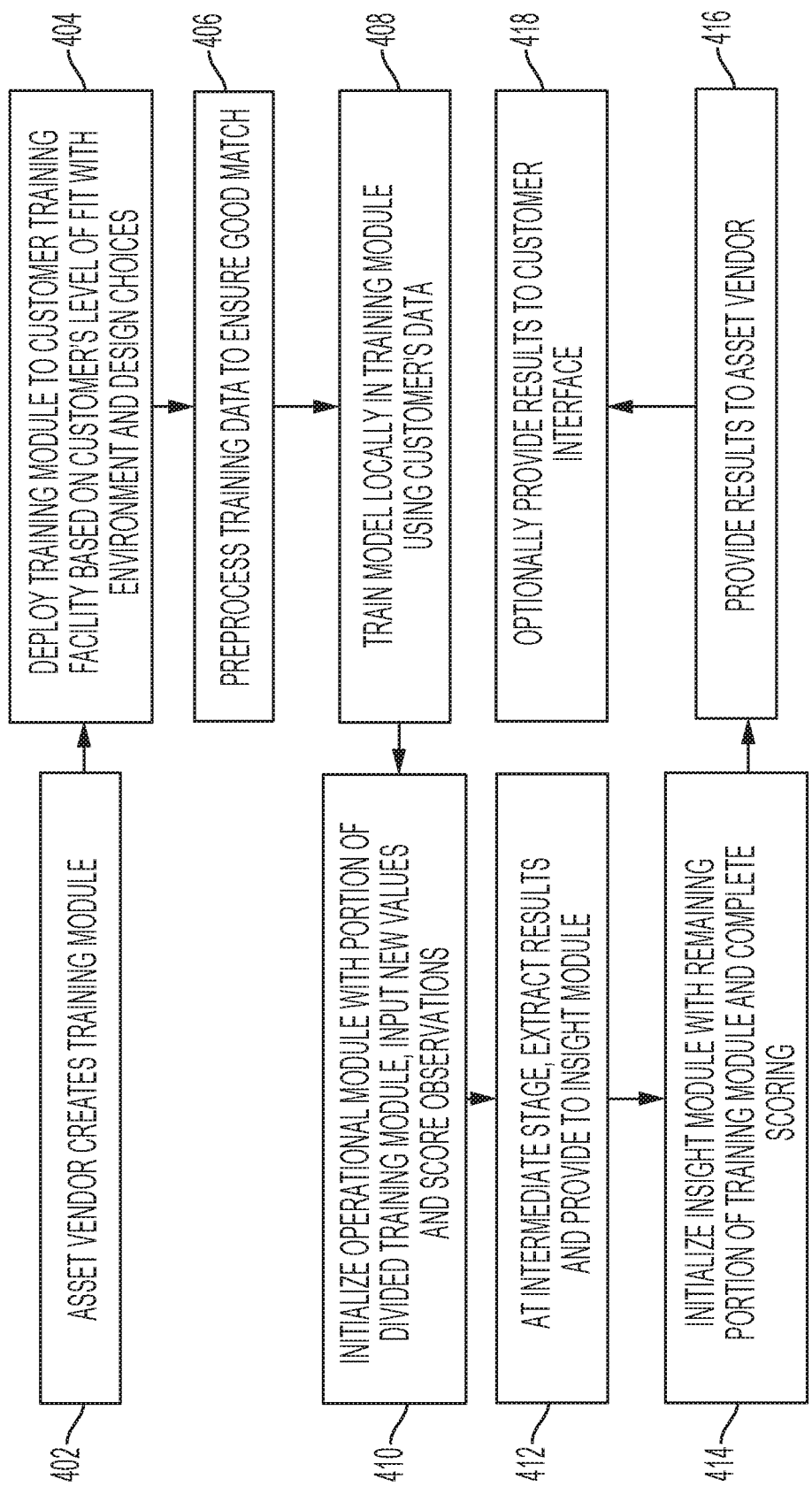
FIG. 4 is a flowchart for a method of operating an embodiment of the CFIS in accordance with the disclosure.

A flowchart for a method of operating a CFIS is shown in FIG. 4. The method provides a solution that includes three modules working in tandem, which are a Training Module, an Operational Module, and an Insight Module. The separation of the modules replaces the existing systems in which all data is sent by the data owner to an external entity for training a model. Instead, the customer or data owner receives appropriate models from a fleet of models for the Training module, based on level of fit with their environment and design choices. The customer can then train the models locally on their data using the Training module. This involves some amount of preprocessing which serves as a funnel to ensure a suitable data-model match. The Training module produces the Operational and Insight modules which do not contain any raw customer data. The configuration of the Training module is divided and encrypted to ensure security of the fleet of models. The Operational module is initialized with one half of the divided configuration and starts scoring observations. At an intermediate stage, the results are extracted to be sent to the Insight module. This ensures that models are working on the customer data and that value is being transferred without sharing of actual data. The Insight module is initialized with the second half of the divided configuration and completes the scoring. The asset vendor obtains the results which can be fed back to the customer interface. This ensures that the complete model has never been exposed to the customer yet the results are as per completely trained models.

Accordingly, as shown more particularly in FIG. 4, the method begins with the asset vendor's creation of the training module at 402. The term "module," as used herein, can be understood to mean a container for a model, models, or a portion of a model, and processing instructions for configuration, analysis and scoring of the model. At 404, the training module is deployed to a customer training facility. Deployment of the training module can include selection of one training module from a plurality of training modules, which fits with the training facility's level and type of assets (e.g. motors, pumps, relays, turbines, and the like) and also the facility's environment (e.g. ambient temperature, altitude, humidity, vibration, and the like) and design choices (type of process or combination of processes the assets are used for). When training of the training module is initiated, a preprocessing of data to ensure a good match is performed at 406. While this step may be done optionally, the preprocessing includes that a correct data-model match is achieved. It is worth noting that the trained model does not contain any raw customer data and its configuration is divided and encrypted to ensure security of the fleet of models.

The training of the models in the training module is carried out at 408, locally, using the customer's data at the training facility. The operational module is then initiated at 410 and the insight module is initiated with the remaining portion of the training module at 414, either of which may be done on the vendor or customer system, with portions of the divided configuration of the training module. Observations are also scored still at 410, and results are extracted and provided to the insight module at 412. The scoring is completed at 414 before the results are provided to the vendor at 416 and, optionally, to the client at 418.

In one embodiment, the training, operational and insight modules are all parts of an overall model framework, which is trained in phases and on different systems. Therefore, the creator and exploiter of the technology will be the vendor that designs and deploys the model onto different systems. While portions of the system may be operating on different environments, the proprietary nature of the encrypted modules preserves the vendor's ownership and exploitation thereof such that a single actor, the vendor, is responsible for making and using the systems described herein. Additionally, it should be appreciated that each module can be its own model, which evolves as each component is trained in phases and on different systems, but always under the ownership and control of the vendor.

Figure 5:
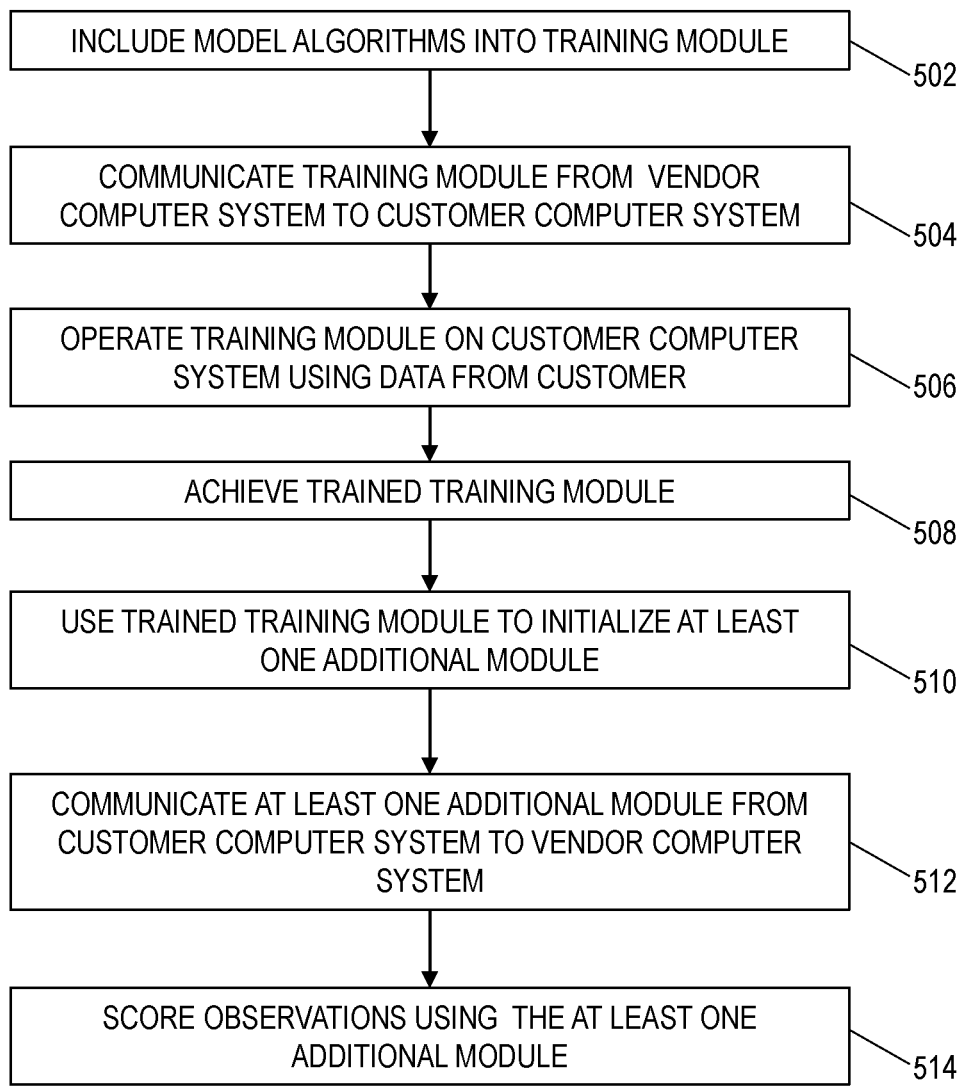
FIG. 5 is a flowchart for a method of facilitating training a model in accordance with the disclosure.

A flowchart for a method of facilitating training a model in accordance with the an exemplary embodiment of the disclosure is shown in FIG. 5. In this embodiment, the flowchart illustrates a method for a vendor to facilitate training a model using data from a customer. The model may contain algorithms. A training process may involve the data from the customer being present in a training infrastructure. As illustrated in FIG. 5, the algorithms of the model are included to a training module at 502. The training module containing the model algorithms is communicated from a vendor's computer system to a customer's computer system at 504. The training module is operated on the customer's computer system using data from the customer at 506. A trained training module is achieved at 508 after operating the training module on the customer's computer system at 506. The trained training module is used to initialize at least one additional module at 510. The at least one additional module is communicated from the customer's computer system to the vendor's computer system at 512. Observations are then scored using the at least one additional module at 514.

Figure 6:
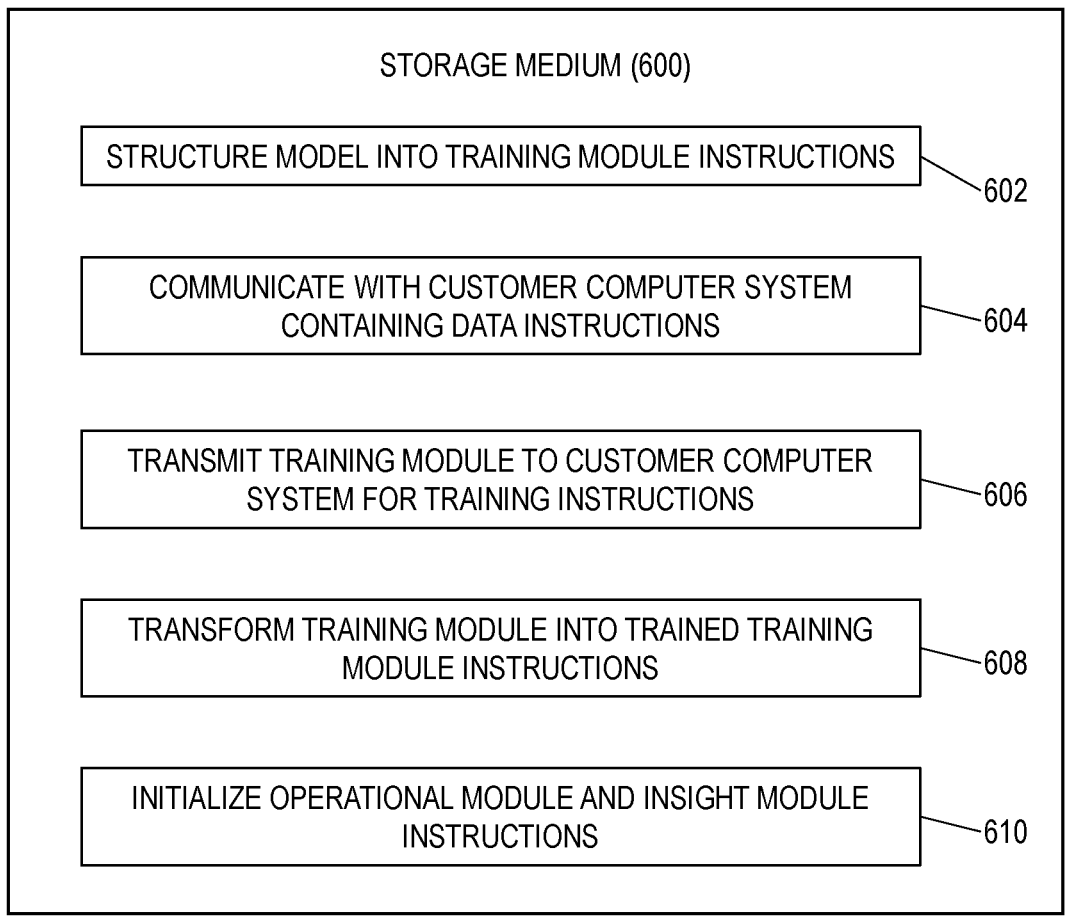
FIG. 6 is a block diagram of a storage medium storing machine-readable instructions in accordance with the disclosure.

A block diagram for a system process contained in a memory as instructions for execution by a processing device coupled with the memory, in accordance with an exemplary embodiment of the disclosure, is shown in FIG. 6. The instructions included on the non-transitory computer readable storage medium 600 cause, upon execution, the processing device of a vendor computer system to carry out various tasks. In the embodiment shown, the memory includes structuring instructions 602 for structuring, using the processing device, a model into a training module. The memory further includes communication instructions 604 for communicating with a customer computer system, the customer computer system containing customer data stored in a computer readable form, and transmission instructions 606 for transmitting the training module to the customer computer system for training based on the customer data. The memory 600 further includes transformation instructions 608 for transforming the training module into a trained training module in customer's computer system, and initialization instructions 610 for initializing an operational module and an insight module.

Figure 7:
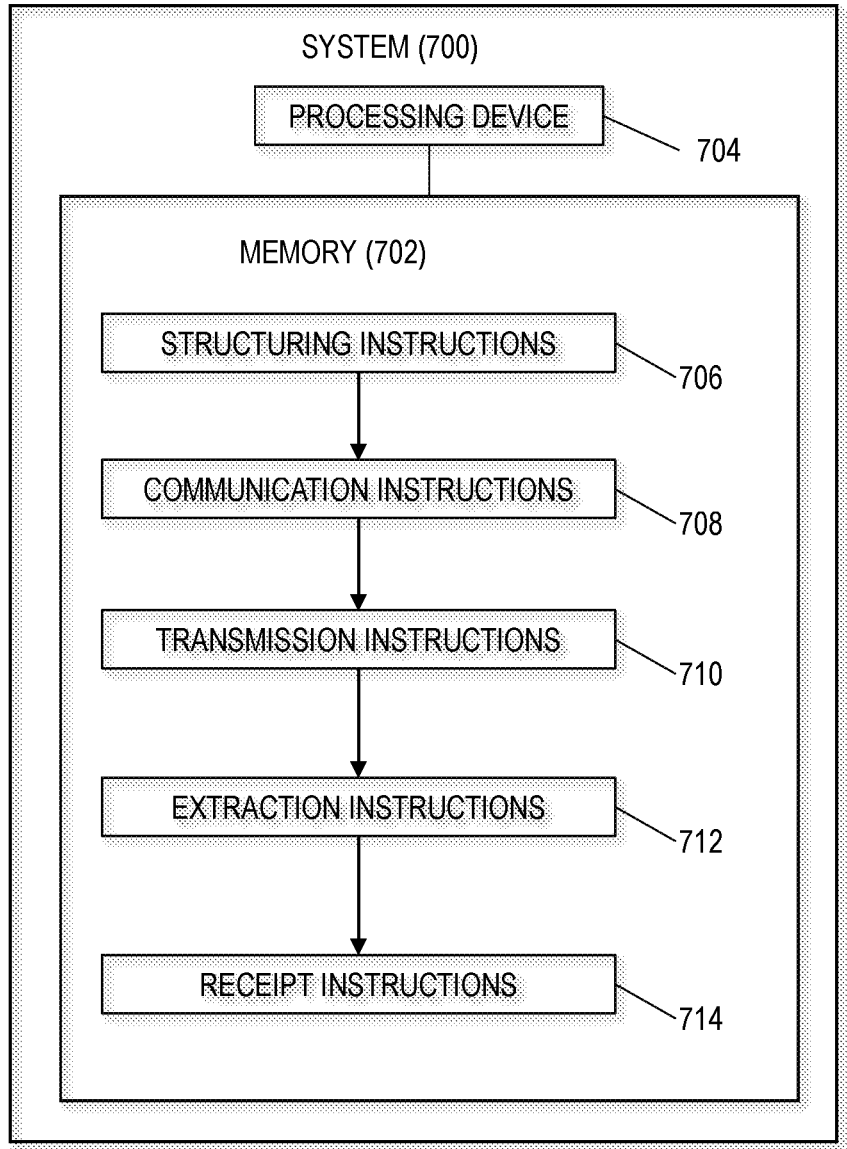
FIG. 7 is a flow diagram for a system process contained in a memory as instructions for execution by a processing device coupled with the memory, in accordance with the disclosure.

A flow diagram for a system process contained in a memory as instructions for execution by a processing device coupled with the memory, in accordance with an exemplary embodiment of the disclosure, is shown in FIG. 7. In this embodiment, the system 700 includes a memory 702 for storing computer-executable instructions, and a processing device 704 operatively coupled with the memory 702 to execute the instructions stored in the memory. The processing device 704 is configured and operates to execute structuring instructions 706 that structure a model into a training module, and communication instructions 708 that communicate with a customer computer system, the customer computer system containing customer data stored in a computer readable form. Further, transmission instructions 710 transmit the training module to the customer computer system for training based on the customer data, and extraction instructions 712 extract training results from a trained training module into an operational module and an insight module in the customer computer system. Receipt instructions 714 receive the insight module from the customer computer system to complete the model. All references, including publications, patent applications, and patents that may be cited herein are incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for a vendor to facilitate training a model using data from a customer, the model containing algorithms, a training process involving the data from the customer being present in a training infrastructure, the method comprising:
   including the algorithms of the model into a training module, the training module existing in an encrypted form;
   communicating the training module from a vendor's computer system to a customer's computer system;
   operating the training module on the customer's computer system using the data from the customer;
   achieving a trained training module after operating the training module on the customer's computer system;
   using a portion of the trained training module to initialize at least one operational module, and using a remaining portion of the trained training module to initialize at least one insight module;
   communicating the at least one insight module from the customer's computer system to the vendor's computer system, the at least one insight module being usable only by the vendor's computer system;
   beginning scoring observations using the at least one operational module; and
   completing scoring observations using the at least one insight module.

2. The method of claim 1, wherein the trained training module is divided into an input portion and an output portion that are communicatively associated through a divide layer,
   wherein the scoring observations are input to the input portion,
   wherein outputs of the input portion are used as inputs to the at least one operational module, and
   wherein outputs of the output portion are used to score the scoring observations using the insight module.

3. The method of claim 1, further comprising preprocessing the data from the customer before providing the data from the customer to the training module for training.

4. The method of claim 3, wherein preprocessing the data from the customer includes at least one of performing a trend analysis, performing a quality analysis, and normalizing the data from the customer.

5. The method of claim 1, wherein communicating the trained training module is accomplished by encrypted electronic communication between the customer's computer system and the vendor's computer system.

6. The method of claim 1, further comprising developing a plurality of training modules, each of the plurality of training modules corresponding to a particular type of asset.

7. The method of claim 6, wherein each of the plurality of training modules corresponds to a particular environment in which an asset is operating, and
   wherein the data from the customer is generated from the asset operating within each particular environment.

8. A non-transitory computer readable storage medium comprising instructions that, when executed by a processing device in a vendor computer system, cause the processing device to:
   structure, using the processing device, a model into a training module, the training module existing in an encrypted form;
   communicate with a customer computer system, the customer computer system containing customer data stored in a computer readable form;
   transmit the training module from the vendor computer system to the customer computer system for training based on the customer data;
   transform the training module into a trained training module in customer's computer system;
   initialize an operational module using a portion of the trained training module;
   initialize an insight module using a remaining portion of the trained training module; and
   communicate the insight module from the customer computer system to the vendor computer system, the insight module being usable only by the vendor computer system.

9. The non-transitory computer readable storage medium of claim 8, wherein the training module includes computer executable instructions that are adapted to be executed by a processing device included within the customer computer system, the computer executable instructions causing the processing device of the customer computer system to:
   preprocess the customer data;
   ingest the customer data into the training module to train the model and yield the trained training module; and
   preserve the training module and the trained training module in an encrypted form.

10. The non-transitory computer readable storage medium of claim 9, wherein preprocessing the customer data includes at least one of performing a trend analysis, performing a quality analysis, and normalizing the customer data.

11. The non-transitory computer readable storage medium of claim 10, wherein the trained training module is divided into an input portion and an output portion that are communicatively associated through a divide layer,
   wherein outputs of the input portion are used to score observations for the operational module, and
   wherein outputs of the output portion are used to score observations for the insight module.

12. The non-transitory computer readable storage medium of claim 8, wherein receiving the operational and insight modules is accomplished by encrypted electronic communication between the customer's computer system and the vendor computer system.

13. The non-transitory computer readable storage medium of claim 8, further comprising a plurality of models, each of the plurality of models corresponding to a particular type of asset.

14. A system, comprising:
a memory to store instructions;
a processing device operatively coupled with the memory to execute the instructions stored in the memory, the processing device configured and operating to:
structure a model into a training module, the training module existing in an encrypted form;
communicate with a customer computer system, the customer computer system containing customer data stored in a computer readable form;
transmit the training module from a vendor computer system to the customer computer system for training based on the customer data;
extract training results from a portion of the trained training module into an operational module and using a remaining portion of the trained training module to initialize an insight module in the customer computer system; and
receive, at the vendor computer system, the insight module from the customer computer system to complete the model, the insight module being usable only by the vendor computer system.

15. The system of claim 14, wherein the training module includes computer executable instructions that are adapted to be executed by the processing device included within the customer computer system, the computer executable instructions causing the processing device of the customer computer system to:
preprocess the customer data;
ingest the customer data into the training module to train the training module and yield the trained training module; and
preserve the training module and the trained training module in an encrypted form.

16. The system of claim 15, wherein preprocessing the customer data includes at least one of performing a trend analysis, performing a quality analysis, and normalizing the customer data.

17. The system of claim 16, wherein the trained training module is divided into an input portion and an output portion that are communicatively associated through a divide layer,
wherein outputs of the input portion are used to score observations for the operational module, and
wherein outputs of the output portion are used to score observations for the insight module.

18. The system of claim 14, wherein receiving the trained training module is accomplished by encrypted electronic communication between the customer computer system and the vendor computer system.

19. The system of claim 14, further comprising a plurality of models, each of the plurality of models corresponding to a particular type of asset.

20. The system of claim 19, wherein each of the plurality of models corresponds to a particular environment in which an asset is operating, and
wherein the customer data is generated from the asset operating within each particular environment.

21. The method of claim 1, wherein scoring observations comprises distributed scoring comprising at least one of: structure-weight split, layer split, loss-activation split, and hash encoder split.

* * * * *